United States Patent [19]

Yokota et al.

[11] Patent Number: 5,039,471
[45] Date of Patent: Aug. 13, 1991

[54] PROCESS FOR PRODUCING A ROLLED FILM OR SHEET

[75] Inventors: Junichiro Yokota; Susumu Arase; Hiroshi Takasu, all of Ichiharashi, Japan

[73] Assignee: Chisso Corporation, Japan

[21] Appl. No.: 464,022

[22] Filed: Jan. 12, 1990

[30] Foreign Application Priority Data

Jan. 26, 1989 [JP] Japan .................................. 1-17055

[51] Int. Cl.⁵ .......................................... B29C 55/04
[52] U.S. Cl. ........................... 264/280; 264/210.2; 264/210.7; 264/288.4; 264/290.2; 425/363
[58] Field of Search .............. 264/280, 210.1, 210.2, 264/288.4, 290.2, 210.7; 425/363, 366

[56] References Cited

U.S. PATENT DOCUMENTS

| | | | |
|---|---|---|---|
| 2,505,146 | 4/1950 | Ryan | 264/288.4 |
| 3,320,225 | 5/1967 | Bradbury | 264/210.2 |
| 3,350,491 | 10/1967 | Rasmussen | 264/288.4 |
| 3,354,253 | 11/1967 | Rasmussen | 264/288.4 |
| 3,370,111 | 2/1968 | Boone | 264/290.2 |
| 3,491,185 | 1/1970 | Rasmussen | 264/288.4 |
| 4,475,971 | 10/1984 | Canterino | 264/288.4 |
| 4,789,514 | 12/1988 | Lo | 264/280 |

FOREIGN PATENT DOCUMENTS

| | | | |
|---|---|---|---|
| 58-136418 | 8/1983 | Japan | 264/210.1 |
| 61-31229 | 2/1986 | Japan | 264/290.2 |
| 62-105620 | 5/1987 | Japan | 264/290.2 |
| WO88/02304 | 4/1988 | PCT Int'l Appl. | 264/290.2 |

*Primary Examiner*—Jeffery Thurlow
*Attorney, Agent, or Firm*—Leydig, Voit & Mayer

[57] ABSTRACT

A process is provided for producing a rolled thermoplastic resin film or sheet having a small difference in mechanical strength between the longitudinal and lateral dimensions of the film or sheet comprising rolling a thermoplastic resin material at least once by means of a pair of rolls arranged obliquely to the advancing direction of the resin material, followed by further rolling at least once the resulting film or sheet by means of another pair of rolls arranged obliquely to the advancing direction of the material, but symmetrically opposite to the former oblique arrangement, the temperature of the rolling and further rolling being room temperature or higher and lower than the melting point or softening point of the resin material, and the distance ($d_1$) between the lateral end parts on one side of each pair of rolls which first contact the resin material being less than the distance ($d_2$) between lateral end parts on the opposite side of each pair of rolls.

8 Claims, 2 Drawing Sheets

PROCESS FOR PRODUCING A ROLLED FILM OR SHEET

BACKGROUND OF THE INVENTION

1. Field of the Invention

This invention relates to a process for producing a rolled thermoplastic resin film or sheet. More particularly it relates to a process for producing a film or sheet having improved mechanical strength in the longitudinal direction and in the lateral direction and whitening on bending (hereinafter abbreviated merely to whitening).

2. Description of the Related Art

When thermoplastic resin films or sheets are oriented by rolling, films or sheets uniaxially oriented in the longitudinal direction are generally formed. However, films or sheets oriented in the longitudinal direction have drawbacks such that the difference between the mechanical strength of the resulting films or sheets in the longitudinal direction and that in the lateral direction is not only large, but also when they are bent in parallel to the longitudinal axis thereof, whitening occurs. Such drawbacks have been overcome by orienting them biaxially in the longitudinal direction and in the lateral direction to thereby improve the strength and elastic modulus thereof while retaining the balance between the strength and elastic modulus in the longitudinal direction and those in the lateral direction. For example, Japanese patent application laid-open No. Sho 62-280014/1987 discloses a process of reciprocating a pair of rolls placed parallel to the longitudinal direction of a material in the lateral direction to roll the material in the lateral direction, followed by continuously rolling the resulting material in the longitudinal direction by means of a pair of rolls placed perpendicularly to the longitudinal direction of the material to obtain a sheet or film having a small anisotropy therein. Further, Japanese patent publication No. Sho 46-7478/1971 discloses a process of biaxially rolling a material in an oblique direction while preventing the material from shifting in the lateral direction at the time of the oblique rolling, by means of a pair of planetary rolls to obtain a film or sheet material having a non-anisotropically oriented configuration and having improved mechanical properties.

According to these processes, however, costs required for manufacture of the device and its maintenance as well as its operation are enormous as compared with those in the case of general rolling devices. Moreover, according to rolling by means of the rolls in the lateral direction disclosed in the above Japanese patent application laid-open No. Sho 62-280014 or that by means of the planatory rolls disclosed in the above Japanese patent publication No. Sho 46-7478, there occurs a drawback that contact of the rolls with the film or sheet is discontinuous; hence in order to make uniform the thickness of the rolled film or sheet in the longitudinal direction, operating conditions of the device such as rolling speed, etc. are very much restricted.

The present inventors have made extensive research in order to overcome these drawbacks. As a result, we have found that when thermoplastic resin materials (hereinafter referred to as resin materials) are rolled in an oblique direction to that of the advancing direction of the materials, if a difference is provided between the distance between both of the ends on one side of a pair of rolls and the distance between both of the ends on the other side of the pair of rolls, it is possible to prevent the resin materials from falling off the rolls, and it is also possible to produce a rolled film or sheet having a uniform thickness thereof in the longitudinal direction, a small difference between the mechanical strength in the longitudinal direction and that in the lateral direction, a product exhibiting no whitening when bent, and at a production cost and operation cost similar to those of conventional rolling devices.

SUMMARY OF THE INVENTION

As apparent from the above description, the object of the present invention is to provide a process for producing a rolled film or sheet of thermoplastic resins having a small difference between the mechanical strength in the longitudinal direction and that in the lateral direction, exhibiting no whitening when bent and having a cheap manufacturing cost of the device and a cheap operating cost.

The present, invention resides in (1) A process for producing a rolled film or sheet which comprises rolling a thermoplastic resin material by means of a pair of rolls arranged obliquely to the advancing direction of said material, followed by further rolling the resulting material by means of another pair of rolls arranged obliquely to the advancing direction of the material, but symmetrically reverse to the former oblique arrangement, the respective pairs of rolls being used at least once, the temperature of rolling being room temperature or higher and lower than the melting point or softening point of the resin material, and the distance ($d_1$) between both of the lateral end parts on one side of the respective pairs of rolls which first contacts the resin material being made less than the distance ($d_2$) between both of the opposite side lateral end parts of the respective pairs of rolls.

(2) A process for producing a rolled film or sheet according to item (1), wherein the difference between said distance ($d_1$) and said distance ($d_2$) i.e. $\Delta d = d_2 - d_1$ satisfies the following expression [I]:

$$6.876 \times 10^{-6} \cdot \{(L \cdot r(\pi \cdot D)^2 \cdot W)/(a \cdot T^4)\}^{\frac{1}{2}} \leq \Delta d \leq 5 \quad [I]$$

wherein L, D, a, r, W and T represent the roll length (mm), the roll diameter (mm), the angle (°) of roll against thermoplastic resin material, the thickness reduction (%), the lateral width of thermoplastic resin material (mm) and the thickness of thermoplastic resin material, respectively.

In this figure, numeral 1 represents a feed roll for thermoplastic resin material. Numerals 2 and 2' each represent a roll; "a" represents the angle of rolls against thermoplastic resin material; $d_1$ and $d_2$ each represent the roll distance between both the ends of rolls; 5 represents an obliquely rolled thermoplastic resin material; and 3 represents a take-up unit.

Figure 1A:
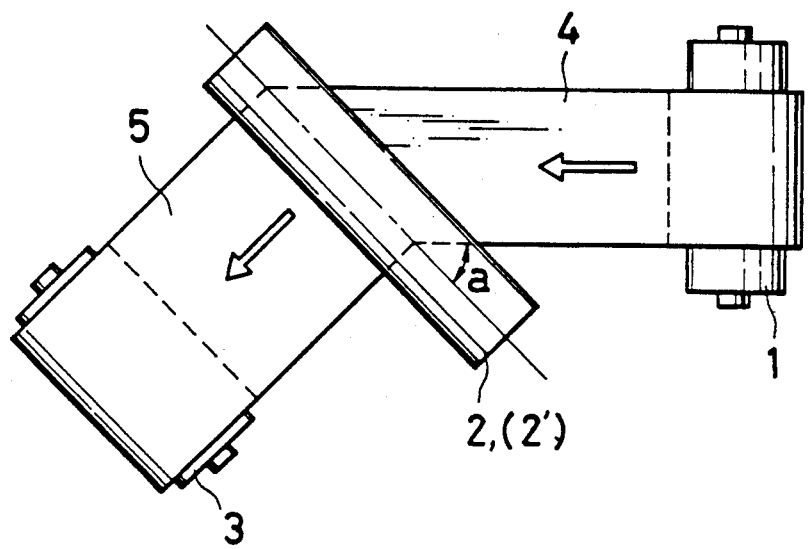
FIG. 1a shows a schematic plan view illustrating the obliquely rolling step used in the present invention.
Figure 2A:
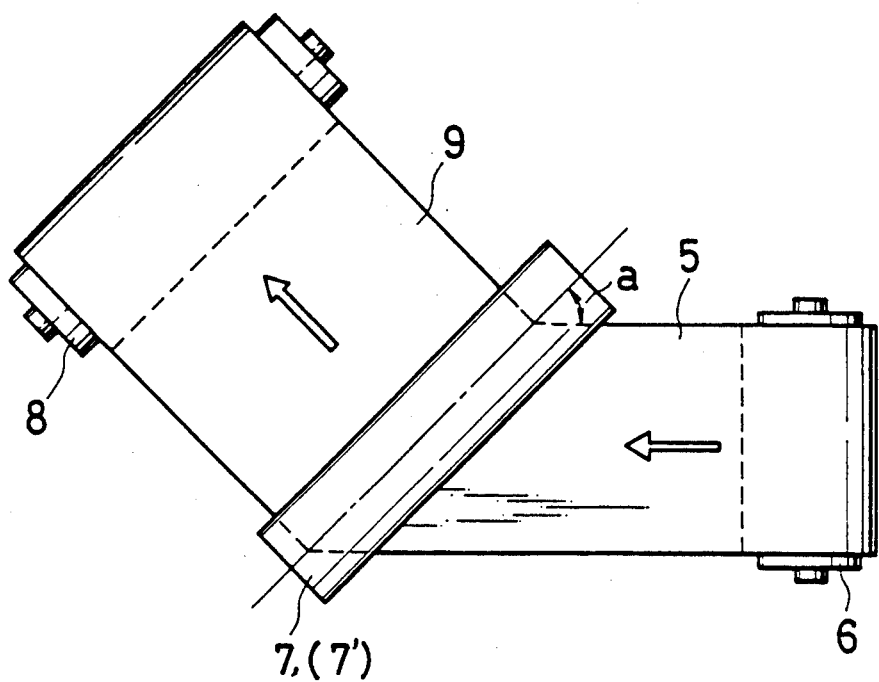

FIG. 2a shows a schematic plan view illustrating the obliquely rolling step arranged in a symmetrically reverse manner relative to FIG. 1a, used in the present invention.

Figure 2B:
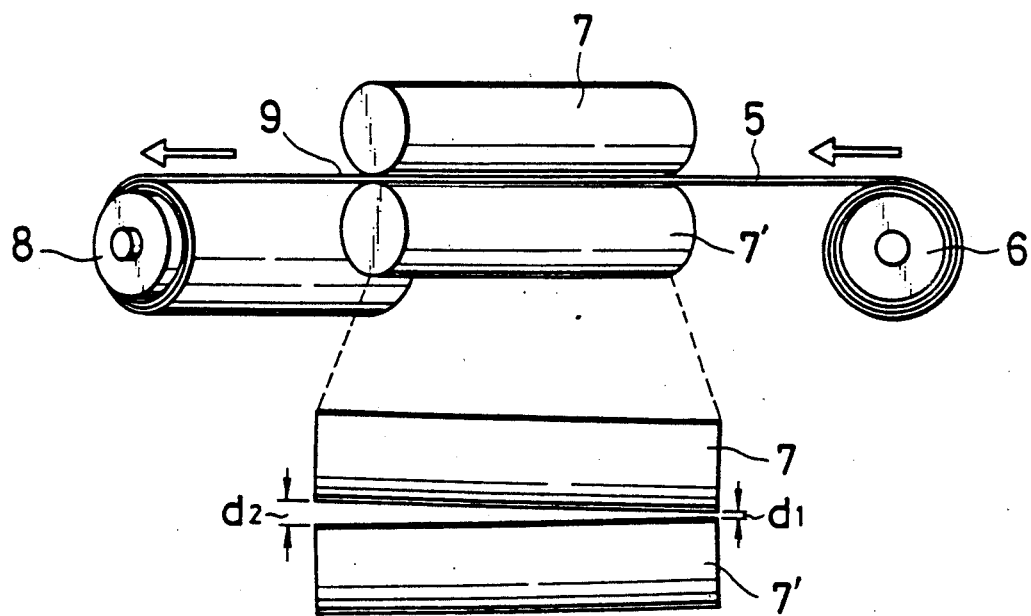

FIG. 2b shows a schematic front view of FIG. 2a and a view illustrating the respective distances between both the ends of rolls on one side and the opposite side thereof.

Figure 1B:
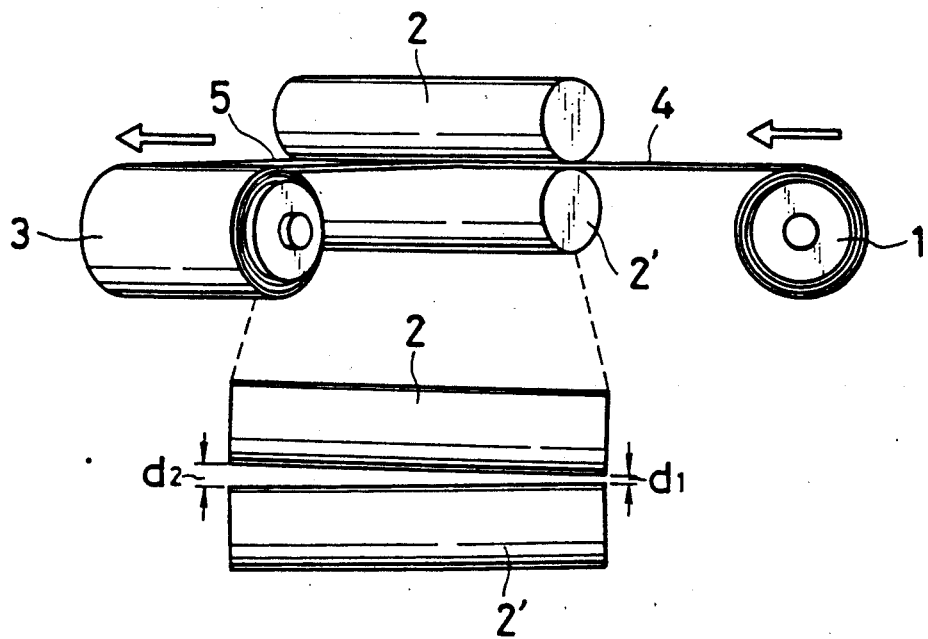
FIG. 1b shows a schematic front view illustrating the same and a view illustrating the respective distances between both of the ends on one side of a pair of rolls and both of the ends on the opposite side thereof.

In this figure, numeral 6 represents a feed roll for thermoplastic resin material; 5 represents a thermoplastic resin material rolled obliquely to the direction shown in FIG. 1; 7 and 7' each represent a roll; 9 represents an again obliquely rolled thermoplastic resin material; and 8 represents a take-up unit.

DETAILED DESCRIPTION OF PREFERRED EMBODIMENTS

Examples of the thermoplastic resin material used in the present invention are polyolefin resins such as homopolymers e.g. polyethylene, polypropylene, polybutene-1, poly(4-methylpentene-1), etc., crystalline copolymers of propylene with at least one member of other α-olefins e.g. ethylene, butene-1, hexene-1, heptene-1, octene-1, decene-1, etc. the content of propylene component therein being 70% by weight or more, copolymers of propylene or the above at least one member of other α-olefins with a polar monomer e.g. vinyl acetate, acrylic acid, methyl acrylate, ethyl acrylate, butyl acrylate, methacrylic acid, methyl methacrylate, ethyl methacrylate, butyl methacrylate, etc., polyamide resins e.g. nylon-6, nylon-66, nylon-12, nylon-610, nylon-11, etc., thermoplastic polyester resins, e.g. polyethylene terephthalate, polybutylene terephthalate, etc., polyacetal resins, acrylonitrile-butadiene-styrene copolymer resin, polystyrene resin, polyvinyl chloride resin, and mixtures of the foregoing, etc., but the thermoplastic resin material is not limited to the above enumerated thermoplastic resins.

Further, it is also possible to use modified resins obtained by copolymerizing an unsaturated carboxylic acid such as maleic acid, acrylic acid, fumaric acid, etc. or derivatives thereof such as anhydrides, esters, etc. thereof, with the above-mentioned thermoplastic resins, or those obtained by subjecting the above thermoplastic resins to ionizing radiation treatment or crosslinking with a crosslinking agent.

In the present invention, it is also possible to use various fillers with the above-mentioned thermoplastic resins. Examples of such fillers are fiber-form fillers such as glass fibers, partially formalized polyvinyl alcohol fibers, etc., flake-form fillers such as mica, talc, etc., spherical fillers such as glass bead, etc., and amorphous fillers such as calcium carbonate, wood chip, etc.

Besides these fillers, it is possible to add extenders, coloring agents, flame-retardants, deterioration-preventing agents, antistatic agents, lubricants, etc.

As to the temperature at which the resin materials are rolled in the present invention i.e. the rolling temperature, it is necessary to roll the materials at room temperature or higher and at a temperature lower than the melting point or softening point of the above thermoplastic resins. If the rolling treatment of the resin materials is carried out at the melting point or softening point of the thermoplastic resins or higher, the resin materials melt or soften so that a film or sheet exhibiting improvement in the tensile strength and elastic modulus resulting from the rolling effect, etc. is not only obtained, but also there occur problems such that molten or softened resin materials adhere to the surfaces of the rolls. On the other hand, if the rolling treatment is carried out at a temperature lower than room temperature, the deformation resistance is so high that it is difficult to impart a uniform deformation to the resin materials.

In the production process of the present invention wherein the resin materials are rolled in an oblique direction, the device used therefor has no particular limitation, and a two-high-mill, four-high-mill, six-high-mill etc. may be employed. The rolls of such rolling devices are arranged obliquely to the advancing or forward direction of resin materials and the materials are rolled to orient the molecular chains of the thermoplastic resin of the materials in the oblique direction whereby a film or sheet having improved mechanical strength, etc. is obtained. At the time of this operation, since the resin materials are arranged obliquely to the rolls, a force of shifting in the lateral direction besides the above advancing direction functions upon the resin materials so that the resin materials tend to fall off from the rolls. Thus, when the distance ($d_1$) between both of the lateral end parts on one side of a pair of rolls is made less than the distance ($d_2$) between both of the lateral end parts on the opposite side of the pair of rolls, then the above force of shifting in the lateral direction is suppressed to prevent the resin materials from falling off from the rolls.

Further, when an oblique rolling is similarly carried out by means of another pair of rolls obliquely arranged but in a symmetrically reverse or opposite direction to the direction of the oblique arrangement of the above-mentioned pair of rolls, then it is possible to produce a thermoplastic resin film or sheet having improved the mechanical strengths in both the longitudinal and lateral directions and free from whitening and having the same physical properties as those of biaxially oriented thermoplastic resin film or sheet.

The present invention will be described in more detail referring to the accompanying drawings.

As illustrated in FIG. 1, when a film or sheet 4 of a resin material sent from a feed unit 1 is rolled by means of a pair of rolls 2 and 2', the rolls 2 and 2' are arranged obliquely to the advancing direction of the film or sheet at an angle (a) of 20° to 73° and the distance ($d_1$) between both of the lateral end parts on one side of the pair of rolls that first contacts a portion of the film or sheet is made less than the distance ($d_2$) between both of the lateral end parts on the opposite side of the pair of rolls. The resulting resin material 5 rolled in the oblique direction is taken up on a take-up unit 3.

At that time, the difference between the former distance ($d_1$) between both the lateral end parts on one side of the rolls and the latter distance ($d_2$) between both the lateral end parts on the opposite side thereof ($\Delta d = d_2 - d_1$ (mm)) is affected by the roll length (L (mm)), the roll diameter (D (mm)), the angle of the resin material against the rolls (a (°)), the thickness reduction (r (%)), the lateral width of the material (W (mm)) and the thickness of the material (T (mm)), respectively; thus the $\Delta d$ is preferred to satisfy the following expression:

$$6.876 \times 10^{-6} \cdot \{(L \cdot r(\pi \cdot D)^2 \cdot W)/(a \cdot T^{\frac{1}{2}})\}^{\frac{1}{2}} \leq \Delta d \leq 5 \qquad [I]$$

If the above difference $\Delta d$ is less than $6.876 \times 10^{-6} \cdot \{(L \cdot r(\pi \cdot D)^2 \cdot W)/(a \cdot T^{\frac{1}{2}})\}^{\frac{1}{2}}$, then there is a fear that the mechanical strength of the resulting film or sheet in the lateral direction and its whitening cannot be sufficiently improved, while if Δd>5 mm, it is often impossible to impart a uniform rolling effect to the resin material.

Next, when the obliquely rolled material 5 is further obliquely rolled in the opposite or reverse direction to that shown in FIG. 1 by means of rolls 7 and 7' shown in FIG. 2, then a rolled film or sheet having a small difference between the strengths in the longitudinal direction and the lateral direction is obtained. If the angle "a" of the obliquely arranged rolls exceeds 73°, rolling in the lateral direction is insufficient so that improvement in the mechanical strength of the resulting film or sheet in the lateral direction and its whitening cannot be expected, while if the angle is less than 20°, it is difficult to prevent the resin material from falling off from the rolls.

In the present invention, it is also possible to carry out the operations illustrated in FIG. 1 and FIG. 2, repeatedly, and if necessary it is also possible to provide pinch rolls or rolls in front or rear of the above rolls.

The thickness reduction (r (%)) in the present invention can be expressed by the following equation:

$$r = 100 \cdot (H-h)/H$$

wherein H represents the thickness of the resin material before the rolling and h represents that after the rolling.

The ultimate thickness reduction of the rolled film or sheet is preferably in the range of 30% to 95%. If the thickness reduction is lower than 30%, the transparency is not sufficiently improved and gives an opaque film or sheet, while if the thickness reduction exceeds 95%, the deformation resistance is so high that the cost of the rolling device is enormous; hence it is difficult to apply such an excess thickness reduction to commercial production.

Films or sheets as a resin material before the rolling may be those prepared according to known molding processes such as a T-die process, inflation process, etc. Further, such films or sheets may be of single layer or two or more layers.

The present invention will be described in more detail by way of examples and comparative examples, but it should not be construed to be limited thereto. In addition, in these examples and comparative examples, the tensile strength of the resulting film or sheet was measured according to JIS K7113, and the whitening was measured by observing the state of the material formed when bent by hands.

EXAMPLE 1

A sheet of a propylene homopolymer (abbreviated to PP) (melt flow rate 1.0 g/10 min., density 0.90 g/cc, and m.p. 162° C.) having a thickness of 1.5 mm and a width of 100 mm was rolled in an oblique direction by means of rolls (hard chromium-plated; temperature 110° C.) of 300 mm in roll diameter and 400 mm wide arranged obliquely (at an angle of 45°) to the advancing direction of the sheet so as to give a Δd of 0.1 mm to obtain a rolled sheet 0.75 mm thick and 139 mm wide, followed by further obliquely rolling the resulting sheet by means of rolls under the same conditions as above, arranged in an oblique direction (at an angle of 45°) symmetrically reverse to the above so as to give a Δd of 0.12 mm to obtain a rolled sheet 0.38 mm thick and 193 mm wide.

COMPARATIVE EXAMPLE 1

The same rolled sheet as in Example 1 was, as it was, subjected to measurements of tensile strength and whitening.

COMPARATIVE EXAMPLES 2 AND 3

Example 1 was repeated except that the arrangement angle "a" of rolls was changed to 90° or 80°, and the Δd was varied to 0 mm or 0.38 mm to obtain rolled sheets having a thickness of 0.38 mm and a width of 100 mm or 105 mm, respectively.

With sheets obtained in Example 1 and Comparative examples 1–3, the tensile strength and whitening thereof were measured. The results are shown in Table 1.

EXAMPLE 2

A sheet of an ethylene-propylene random copolymer sheet (abbreviated to R-PP) (melt flow rate 2.2 g/10 min., density 0.90 g/cc, m.p. 142° C., ethylene content 4 mol % and propylene content 96 mol %) having a thickness of 1.5 mm and a width of 100 mm was rolled in an oblique direction by means of rolls (hard chromium-plated; temperature 90° C.) of 300 mm in roll diameter and 400 mm wide arranged obliquely to the advancing direction of the sheet at 45° so as to give a Δd of 0.1 mm to obtain a rolled sheet 0.78 mm thick and 138 mm wide, followed by further obliquely rolling the resulting sheet by means of rolls under the same conditions as above, arranged in an oblique direction (at an angle of 45°) symmetrically reverse to the above so as to give a Δd of 1.1 mm to obtain a rolled sheet 0.41 mm thick and 170 mm wide.

COMPARATIVE EXAMPLE 4

Example 2 was repeated except that the arrangement angle "a" and the Δd of the rolls were varied to 85° and 0.08 mm, respectively, to obtain a rolled sheet 0.41 mm thick and 105 mm wide. With the resulting rolled sheet, the tensile strength and whitening thereof were measured. The results are collectively shown in Table 1.

EXAMPLE 3

A sheet of an ethylene-propylene block copolymer (abbreviated to B-PP) (melt flow rate 0.5 g/10 mm, density 0.91 g/cc, m.p. 160° C., ethylene content 8 mol % and propylene content 92 mol %) having a thickness of 0.65 mm and a width of 100 mm was rolled in an oblique direction by means of rolls (hard chromium-plated; temperature 110° C.) of 300 mm in roll diameter and 400 mm wide, arranged obliquely (at an angle of 55°) to the advancing direction of the sheet, so as to give a Δd of 0.08 mm to obtain a sheet 0.50 mm thick and 120 mm wide, followed by obliquely rolling the resulting sheet by means of rolls under the same conditions as above, arranged in an oblique direction (at an angle of 55°) symmetrically reverse to the above so as to give a Δd of 0.08 mm to obtain a rolled sheet 0.25 mm thick and 141 mm wide.

COMPARATIVE EXAMPLE 5

Example 3 was repeated except that the arrangement angle "a" and Δd of the rolls were varied to 90° and 0 mm, respectively, to obtain a rolled sheet 0.25 mm thick and 100 mm wide.

With the resulting rolled sheet, the tensile strength and whitening thereof were measured. The results are collectively shown in Table 1.

EXAMPLE 4

A sheet of a high density ethylene homopolymer (abbreviated to PE) (melt index 0.8 g/10 min., density 0.94 g/cc and m.p. 130° C.) having a thickness of 1.8 mm and a width of 100 mm was rolled in an oblique direction by means of rolls (hard chromium-plated; temperature 90° C.) of 300 mm in roll diameter and 400 mm wide, arranged obliquely (at an angle of 45°) to the advancing direction of the sheet so as to give a Δd of 0.1 mm to obtain a sheet 0.84 mm thick and 135 mm wide, followed by further obliquely rolling the resulting sheet by means of rolls under the same conditions as above, arranged in an oblique direction (at an angle of 45°) symmetrically reverse to the above so as to give a Δd of 0.1 mm to obtain a rolled sheet 0.40 mm thick and 180 mm wide.

COMPARATIVE EXAMPLE 6

Example 4 was repeated except that the arrangement angle "a" and Δd of the rolls were varied to 85° and 0.08 mm, respectively.

With the resulting rolled sheet, the tensile strength and whitening thereof were measured. The results are collectively shown in Table 1.

TABLE 1

| | Resin | M.P. °C. | Rolling temperature (°C.) | Thickness reduction (%) | Rolling angle (°) | Tensile strength in longitudinal Kg/mm² | Tensile strength in lateral direction Kg/mm² | Whitening |
|---|---|---|---|---|---|---|---|---|
| Ex. 1 | PP | 162 | 110 | 75 | 45 | 12.5 | 10.2 | None |
| Comp. 1 ex. | PP | 162 | — | 0 | — | 3.3 | 3.2 | Yes |
| Comp. 2 ex. | PP | 162 | 110 | 75 | 90 | 19.3 | 3.8 | Yes |
| Comp. 3 ex. | PP | 162 | 110 | 75 | 80 | 17.1 | 4.5 | Yes |
| Ex. 2 | R-PP | 142 | 90 | 73 | 45 | 9.4 | 8.7 | None |
| Comp. 4 ex. | R-PP | 142 | 90 | 73 | 85 | 17.4 | 3.5 | Yes |
| Ex. 3 | B-PP | 160 | 110 | 62 | 55 | 7.4 | 6.5 | None |
| Comp. 5 ex. | B-PP | 160 | 110 | 62 | 90 | 11.3 | 3.1 | Yes |
| Ex. 4 | HDPE | 130 | 90 | 78 | 45 | 10.2 | 9.9 | None |
| Comp. 6 ex. | HDPE | 130 | 90 | 78 | 85 | 16.0 | 3.2 | Yes |

According to the process of the present invention, it is possible to produce a rolled thermoplastic resin film or sheet having improved longitudinal and lateral mechanical strength and diminished whitening and further having small longitudinal and lateral mechanical anisotropies, in a simple manner, without employing any particular device, with simple provisions, with easy operation and economically.

What we claim is:

1. A process for producing a rolled film or sheet which comprises
    rolling a thermoplastic resin material by means of a pair of rolls arranged obliquely to the advancing direction of said resin material, followed by further rolling the resulting resin material by means of another pair of rolls arranged obliquely to the advancing direction of said resin material, but symmetrically opposite to the former oblique arrangement,
    the respective pairs of rolls being used at least once,
    the temperature of said rolling and said further rolling being between room temperature and lower than the melting point or softening point of said resin material, and
    the distance ($d_1$) between the lateral end parts on one side of each pair of rolls which first contact said resin material being less than the distance ($d_2$) between lateral end parts on the opposite side of each pair of rolls.

2. A process for producing a rolled film or sheet according to claim 1, wherein the difference between said distance ($d_1$) and said distance ($d_2$) i.e. $\Delta d = d_2 - d_1$ satisfies the following expression [I]:

$$6.876 \times 10^{-6} \cdot \{(L \cdot r(\pi \cdot D)^2 \cdot W)/(a \cdot T^4)\}^{\frac{1}{3}} \leq \Delta d \leq 5 \quad [I]$$

wherein L, D, a, r, W and T represent the roll length (mm), the roll diameter (mm), the angle (°) of roll against thermoplastic resin material, the thickness reduction (%), the lateral width of thermoplastic resin material (mm) and the thickness of thermoplastic resin material, respectively.

3. A process for producing a rolled film or sheet according to claim 1 wherein said pairs of rolls are arranged obliquely at an angle with respect to the advancing direction of said resin material of 20° to 73°.

4. A process for producing a rolled film or sheet according to claim 1 wherein said resin material is rolled to a reduction in thickness of 30% to 95%.

5. A process for producing a rolled film or sheet according to claim 1 wherein the mechanical strength of the film or sheet produced by said process is high in both the longitudinal and transverse directions and the difference in the strength measured in each direction is small.

6. A process for producing a rolled firm or sheet according to claim 1 wherein the longitudinal axis of said resin material upstream of said pair of rolls is disposed at an angle with respect to the axes of said pair of rolls of less than 90° and the longitudinal axis of said resin material downstream of said pair of rolls is disposed at substantially a right angle with respect to the axes of said pair of rolls.

7. A process for producing a rolled form or sheet according to claim 1 wherein the longitudinal axis of said resin material upstream of said another pair of rolls is disposed at an angle with respect to the axes of said another pair of rolls of less than 90° and the longitudinal axis of said resin material downstream of said another pair of rolls is disposed at substantially a right angle with respect to the axes of said another pair of rolls.

8. A process for producing a rolled film or sheet according to claim 6 wherein the longitudinal axis of said resin material upstream of said another pair of rolls is disposed at an angle with respect to the axes of said another pair of rolls of less than 90° and the longitudinal axis of said resin material downstream of said another pair of rolls is disposed at substantially a right angle with respect to the axes of said another pair of rolls.

* * * * *

UNITED STATES PATENT AND TRADEMARK OFFICE
CERTIFICATE OF CORRECTION

PATENT NO. : 5,039,471

DATED : August 13, 1991

INVENTOR(S) : Yokota et al

It is certified that error appears in the above-identified patent and that said Letters Patent is hereby corrected as shown below:

Column 8, line 55, change "firm" to --film--;
        line 63, change "form" to --film--.

Signed and Sealed this

Second Day of March, 1993

*Attest:*

STEPHEN G. KUNIN

*Attesting Officer*     *Acting Commissioner of Patents and Trademarks*